US009008859B2

(12) United States Patent
Herzog et al.

(10) Patent No.: US 9,008,859 B2
(45) Date of Patent: Apr. 14, 2015

(54) NAVIGATION INSTRUCTIONS USING LOW-BANDWIDTH SIGNALING

(75) Inventors: Shai Herzog, Bellevue, WA (US); Eyal Ofek, Redmond, WA (US); Jeffrey Couckuyt, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 563 days.

(21) Appl. No.: 12/975,586

(22) Filed: Dec. 22, 2010

(65) Prior Publication Data

US 2012/0166077 A1    Jun. 28, 2012

(51) Int. Cl.
G01C 21/34 (2006.01)
G01C 21/00 (2006.01)
G01C 21/36 (2006.01)
G06F 3/01 (2006.01)
H04M 1/725 (2006.01)

(52) U.S. Cl.
CPC ............ G01C 21/3652 (2013.01); G06F 3/016 (2013.01); H04M 1/72522 (2013.01); H04M 1/72572 (2013.01)

(58) Field of Classification Search
USPC ................... 340/407.1, 539.11, 539.13, 944; 342/357.34; 345/156; 715/701; 701/2
See application file for complete search history.

(56) References Cited

U.S. PATENT DOCUMENTS 5,828,321 A   10/1998  Matsuzaki
7,539,576 B2   5/2009  Ohnishi et al.
7,788,032 B2 *  8/2010  Moloney ................. 701/472
2004/0151162 A1   8/2004  Ramaswamy
2004/0155815 A1   8/2004  Muncaster et al.
2006/0184318 A1   8/2006  Yoshimine
2006/0190168 A1   8/2006  Ohnishi et al.

(Continued)

FOREIGN PATENT DOCUMENTS

CN   1745289 A   3/2006
CN   1774614 A   5/2006

(Continued)

OTHER PUBLICATIONS

Gasteratos et al., "A Fuzzy Multi-Sensor Architecture for Indoor Navigation", Retrieved at << http://ieeexplore.ieee.org/stamp/stamp.jsp?tp=&arnumber=5548497 >>, Aug. 16, 2010, pp. 6.

(Continued)

Primary Examiner — Adam Tissot
(74) Attorney, Agent, or Firm — Jessica Meyers; Alin Corie; Micky Minhas (57) ABSTRACT

Navigation instructions using low-bandwidth signaling are supported in an alternative user interface that may be utilized as either a full replacement or as an enhancement to conventional visual/audio navigation interfaces. In one illustrative example, the alternative interface makes use of the more constrained, but generally broadly available low-bandwidth signaling capability of mobile devices to encode navigation instructions in the form of varying patterns of tactile vibrations that may be imparted from the device to a user as haptic feedback. The user can sense the vibrations and readily translate them into the navigation instructions without needing any kind of special decoding equipment or using any special techniques. The vibrations may be encoded using easy to remember patterns so that a full and rich navigation feature set may be accessed with minimal training on the user's part.

23 Claims, 11 Drawing Sheets

(56) References Cited

U.S. PATENT DOCUMENTS

| | | |
|---|---|---|
| 2007/0001904 A1 | 1/2007 | Mendelson |
| 2008/0268874 A1 | 10/2008 | Pizzi |
| 2009/0076723 A1 | 3/2009 | Moloney |
| 2009/0177437 A1 | 7/2009 | Roumeliotis |
| 2010/0318293 A1* | 12/2010 | Brush et al. ............... 701/211 |

FOREIGN PATENT DOCUMENTS

| | | |
|---|---|---|
| CN | 101424536 A | 5/2009 |
| WO | 2007/105937 A1 | 9/2007 |

OTHER PUBLICATIONS

Pietila, Timo, "Alternatives to map-based pedestrian navigation with location-aware mobile devices", Retrieved at << https://publications.theseus.fi/bitstream/handle/10024/10386/Pietila.Timo.pdf?sequence=2 >>, Dec. 2009, pp. 41.

"International Search Report", Mailed Date: Jul. 24, 2012, Application No. PCT/US2011/064298, Filed Date: Dec. 11, 2011, pp. 8.

Fong, et al., "Novel interfaces for remote driving: gesture, haptic and PDA", Retrieved at <<swing.adm.ri.cmu.edu/pub_files/pub2/.../fong_terry_2000_1.pdf>>, In SPIE Telemanipulator and Telepresence Technologies VII, 2000, pp. 12.

"Search Report Issued for European Patent Application No. 11850697.1", Mailed Date: Apr. 28, 2014, 7 Pages.

"Office Action and Search Report Issued in Chinese Patent Application No. 201110435108.X", Mailed Date: Nov. 26, 2013, 6 Pages.

"Second Office Action Issued in Chinese Patent Application No. 201110435108.X", Mailed Date: Jul. 24, 2014, 6 Pages.

State Intellectual Property Office, "Third Office Action Issued in Chinese Patent Application No. 201110435108.X", Mailed Date: Feb. 10, 2015, China.

* cited by examiner

1505 — Encoding Key:
SV=short vibration; LV=long vibration; SB=short blank; VLB=very long blank.
All words are separated by Medium/Long blank

1510

| Instruction number | Instruction Description | Example vibration encoding |
|---|---|---|
| 1 | All Good, continue on same direction, destination not immediately close | SV, VLB |
| 2 | Pay attention (destination close, or routing action to follow) | SV, SV, SV |
| 3 | Wrong way, turn around 180 degrees | SV, SV, LV |
| 4 | Turn right | SV |
| 5 | Turn left | LV |
| 6 | Go 45 degrees right forward | SV, SV |
| 7 | Go 45 degrees left forward | LV, LV |
| 8 | Go up (followed by optional levels number) | SV, SB, SV |
| 9 | Go down (followed by optional levels number) | LV, SB LV |
| 10 | Arrived at destination (or pull out the device for further visual/audio instructions) | LV, LV, LV |

NAVIGATION INSTRUCTIONS USING LOW-BANDWIDTH SIGNALING

BACKGROUND

Mobile navigation systems have been very popular and can offer a comprehensive array of maps, traveling directions, and points of interest to help users know exactly where they are and where they are headed at all times. User-friendly interfaces that can provide turn-by-turn instructions combined with the availability of accurate maps enable navigation systems to reduce travel-related stress and save time and money by helping prevent users front getting lost.

Navigation capabilities are commonly included in mobile devices like cell phones and smart phones. The wide availability and usage of mobile devices with such capabilities can make it easy for a user to navigate in unfamiliar areas on foot when exploring a city, hiking, or walking. Current systems typically rely on visual and auditory prompts to provide navigation instructions to users. While such systems can provide satisfactory performance in many applications, additional mobile navigation features and enhanced functionality are desirable.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Navigation instructions using low-bandwidth signaling are supported in an alternative user interface that may be utilized as either a full replacement or as an enhancement to conventional visual/audio navigation interfaces. In one illustrative example, the alternative interface makes use of the more constrained, but generally broadly available low-bandwidth signaling capability of mobile devices to encode navigation instructions in the form of varying patterns of tactile vibrations that may be imparted from the device to a user as haptic feedback. The user can sense the vibrations and readily translate them into the navigation instructions without needing any kind of special decoding equipment or using any special techniques. The vibrations may be encoded using easy to remember patterns so that a full and rich navigation feature set may be accessed with minimal training on the user's part.

In various illustrative examples, low-bandwidth signaling provides navigation instructions to a user that are implemented using a walking navigation application that executes on a mobile device such as a mobile phone, smartphone, or tablet computer. The walking navigation application can expose a user interface for selecting a target destination such as a restaurant or store in an indoor shopping mall. The application will calculate a route and provide navigation instructions to the user in the form of encoded vibrations to guide the user to the destination in a sequence of easy to follow steps.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
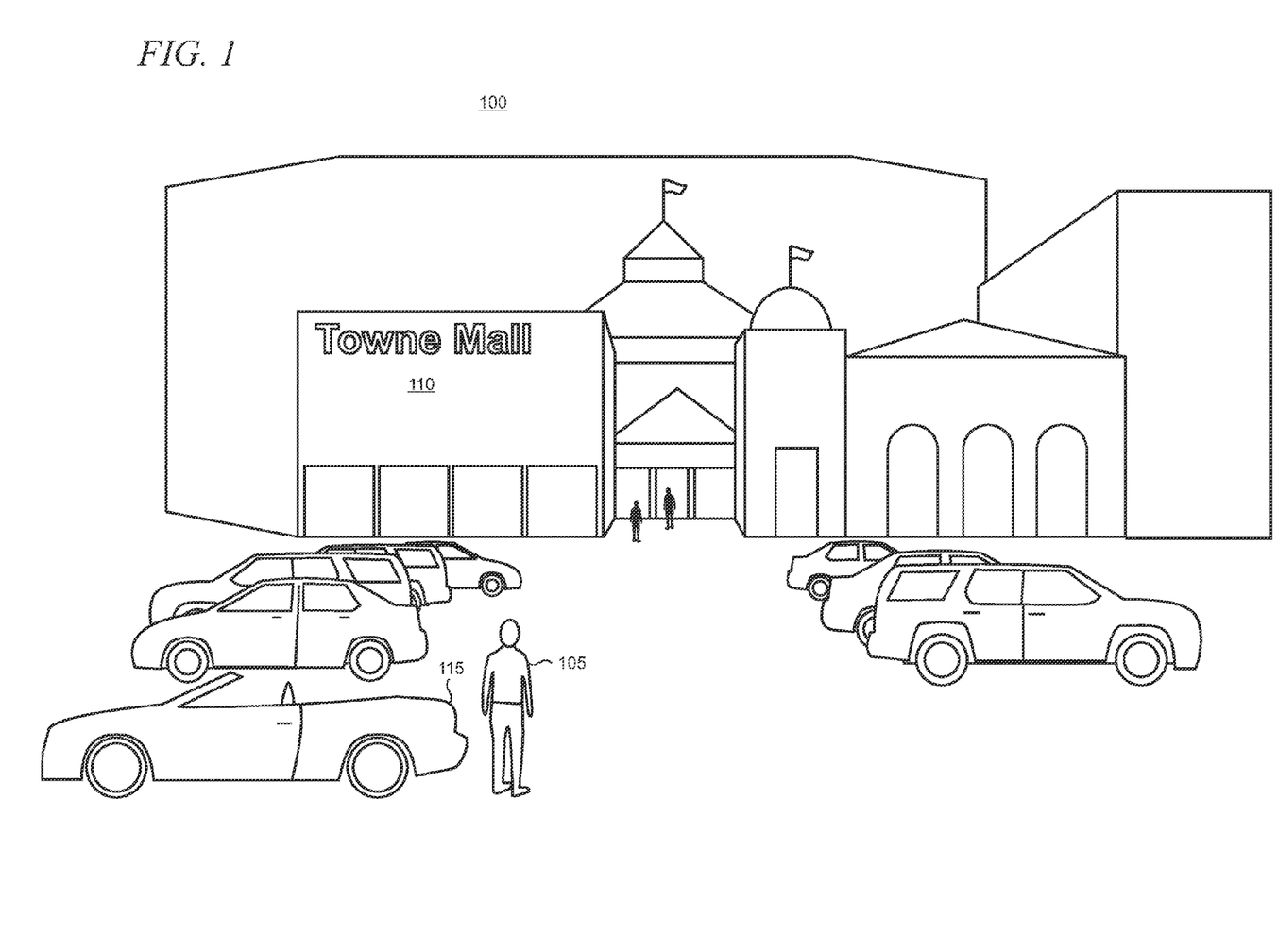
FIG. 1 shows an illustrative usage environment in which the present navigation instructions using low-bandwidth signaling may be implemented.

FIG. 1 shows an illustrative usage environment 100 in which the present navigation instructions using low-bandwidth signaling may be utilized. In a typical scenario, a user 105 arrives at a large indoor facility such as a shopping mall 110 having driven in a car 115 that is equipped with a conventional mobile navigation system using, for example, GPS (Global Positioning System). Mobile navigation systems can be built-in as factory-original equipment to automobiles or added by a dedicated portable GPS navigation system or by a device such as a mobile phone or smartphone that has navigation capabilities. Such conventional systems are generally geared towards a driving environment and thus typically employ maps to provide visual navigation instructions to the user. In many implementations, the visual navigation instructions may be supplemented with audio information such as voice prompts to provide such information as the distance to the next turn and the direction of travel. Navigation systems used in other contexts such as boating and flying commonly utilize similar visual- and audio-based user interfaces.

The video/audio interface provided by current navigation systems can be generally well suited to provide driving directions, for example, from the user's office to the mall 110. However, conventional visual/audio interfaces can often be expected to be sub-optimal when applied to walking scenarios, for example, as in this illustrative example in which the user 105 wants to walk inside the mall 110 to find a particular restaurant or store. High ambient noise levels can make it difficult for the user 105 to hear audio navigation instructions and using a headset to improve noise isolation can be awkward when the user wants to converse with a companion. In addition, using a portable navigation system while walking will typically mean that the user 105 has to hold the device in his or her hand to be able to input data or commands to the system and refer to the visual navigation instructions that are displayed on the device. In addition to being a distraction which can make it difficult to safely navigate in crowded indoor environments, using a mobile device to see visual prompts can again be awkward and tie up the user's hands. Users may also wish to avoid displaying a mobile device in some environments where there might be a risk of loss or theft (for example, in a crowded market, subway, etc.).

In comparison to current navigation systems that utilize conventional visual/audio user interfaces, the present navigation instructions using low-bandwidth signaling are supported in an alternative user interface that may be utilized as either a full replacement or as an enhancement to such conventional interfaces. This alternative interface makes use of the more constrained, but generally broadly available low-bandwidth signaling capability of mobile devices to encode navigation instructions in the form of varying patterns of tactile vibrations that my be imparted from the device to the user 105 as haptic feedback. The vibrations can be sensed by the user 105 through touch or feel and translated into the navigation instructions without needing any kind of special decoding equipment or techniques. Although actuators in mobile devices can sometimes generate vibrations that can be heard, it is anticipated that the tactile sensation provided by the vibrations will typically be the principal way that a user will perceive the signaling used for the navigation instructions and thus helps to avoid the problems associated with audio instructions noted above. Before the present low-bandwidth navigation instruction paradigm is discussed in detail, a short presentation is provided about common mobile devices in which the present navigation paradigm may be typically implemented.

FIGS. 2-6 show various illustrative mobile devices that may include functionalities and execute programming used to implement aspects of the present navigation instructions using low-bandwidth signaling. It is emphasized at the onset that the mobile devices shown in the drawings and described in the accompanying text below are intended to be illustrative only. The present navigation instruction paradigm can be implemented on a variety of devices, or integrated to augment functionality provided by existing navigation systems, as may be required to meet the needs of a particular implementation. In addition, the mobile devices presented here are intended to be representative of platforms that may be suitable to provide navigation instructions using low-bandwidth signaling, but are not intended to be exhaustive.

Figures 2, 3, 4:
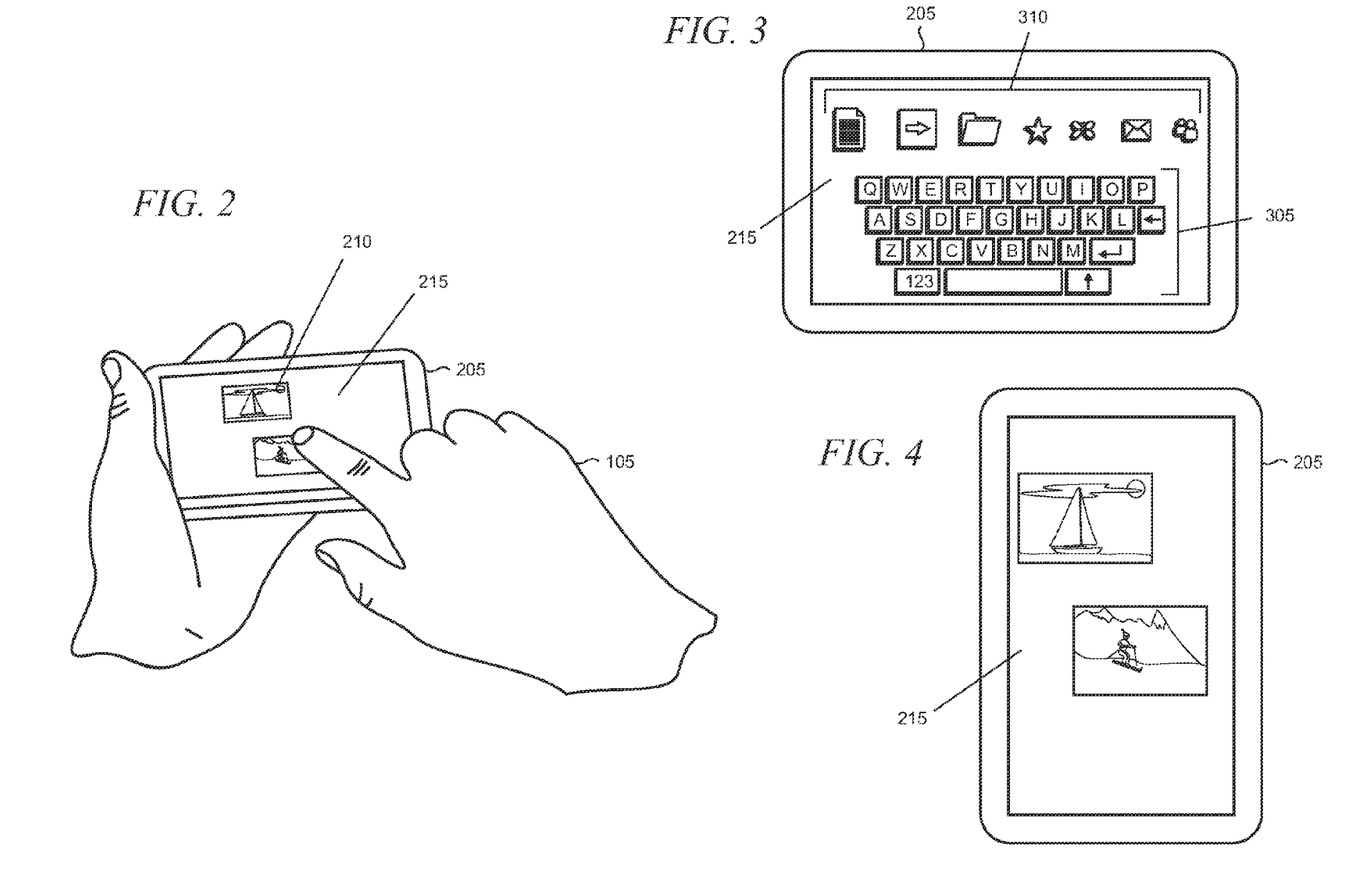
FIGS. 2-6 show various illustrative mobile devices that may include functionalities and execute programming used to implement aspects of the present navigation instructions using low-bandwidth signaling.

FIG. 2 shows a mobile device 205 with which, in this illustrative example the user 105 is interacting to view photographs 210 on a display screen 215. The mobile device 205 is representative of a variety of compact and lightweight battery operated multifunctional devices currently available including, for example, mobile phones, smart phones, PDAs (personal digital assistants), pocket PCs (personal computers), portable email devices, game players, personal media players, portable navigation devices, tablet PCs, digital cameras, and devices that combine functionalities provided by such devices.

As shown in FIGS. 2 and 3, the display screen 215 is configured as a touchscreen that can display graphical control and user interface objects such as keyboard 305 and icons 310 that may be used to facilitate user control over various functions or applications that are capable of executing on the mobile device 205. In some cases, the mobile device 205 may be configured to operate in various orientations such as a "portrait" orientation shown in FIG. 4 which can supplement the "landscape" orientation shown in FIGS. 2 and 3.

Figure 5:
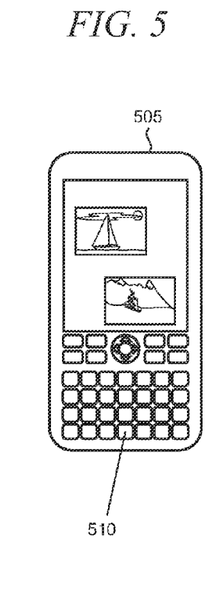
Figure 6:
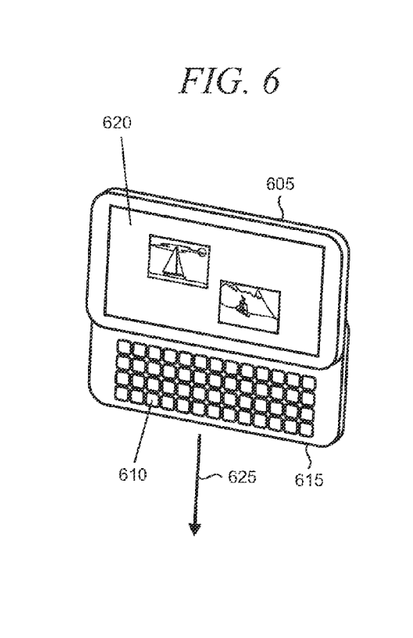

FIGS. 5 and 6 show respective mobile devices 505 and 605 that may also be utilized to support navigation instructions using low-bandwidth signaling in some cases. Mobile devices 505 and 605 utilize physical control elements such as buttons 510 and 610 that may supplement or replace the control objects that are presented virtually on a touchscreen. Mobile device 605 is representative of devices that have form factors using moveable parts. In this example, a keyboard portion 615 of the device slides with respect to the display 620, as indicated by arrow 625 to reveal the buttons 610. Other common form factors include flip clamshell configurations, swivel, and mixed swivel, slide, or flip.

Figure 7:
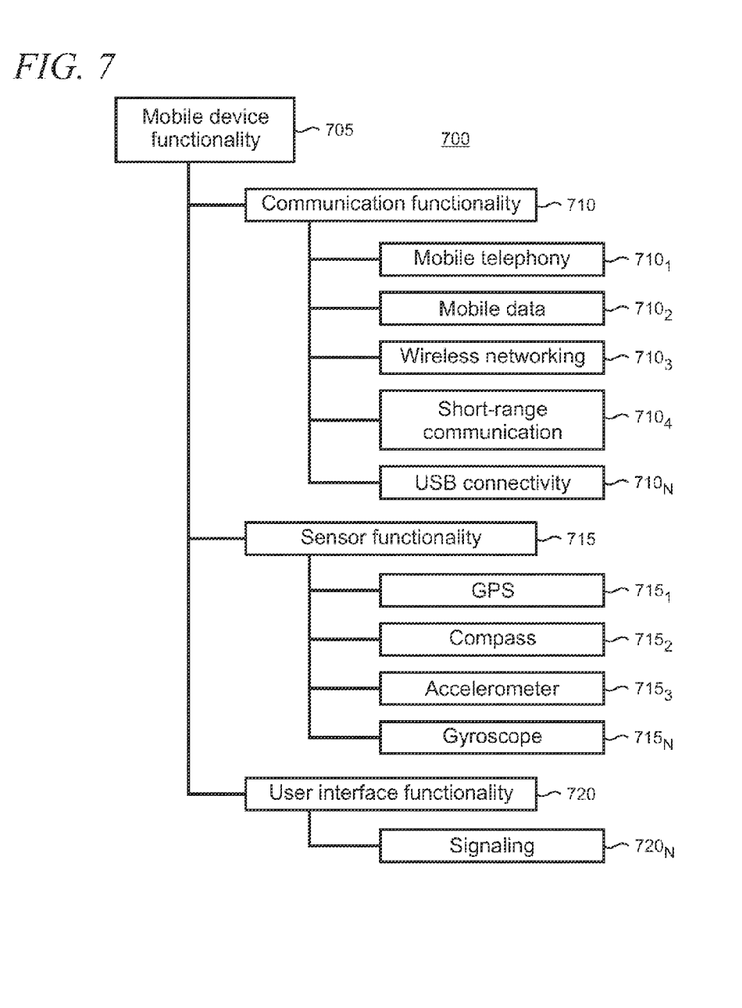
FIG. 7 shows a taxonomy of illustrative functionalities that may be supported by a mobile device.

FIG. 7 shows a taxonomy 700 of illustrative functionalities that may be supported by the mobile device 205 (FIG. 2). it is noted that the functionalities shown in FIG. 7 are considered typical and not all mobile devices have to support all of them in order to implement the present. navigation instructions using low-bandwidth signaling. In addition, mobile devices will commonly support features and functionalities that are not shown in FIG. 7 such as image capture, email, video decoding and playback, and the like that are not particularly pertinent to the present navigation paradigm.

As shown in FIG. 7, mobile device functionality 705 includes communication functionality 710, sensor functionality 715, and user interface functionality 720. In this illustrative example, the communication functionality 710 includes functionality for implementing mobile telephony $710_1$ for voice communications using, for example, GSM/CDMA (Global System for Mobile Communications/Code Division Multiple Access) or TDMA (Time Division Multiple Access); mobile data $710_2$ conforming, for example, to WAP (Wireless Application Protocol); wireless networking $710_3$, for example, conforming with (i.e., IEEE 802.11) or UWB (Ultra Wideband) communication protocols; short-range communication $710_4$ such as BlueTooth, RFID (radio frequency identification), or IrDA (Infrared Data Association); and USB (Universal Serial Bus) connectivity $710_N$. The sensor functionality 715 illustratively includes functionality provided by a GPS $715_1$ for implementing location detection; a compass $715_2$ for directional awareness; an accelerometer $715_3$ for device orientation and motion sensing, image stabilization, and motion input as a user interface control, among other common uses; and, a gyroscope $715_N$ for motion sensing or measurement (used alone or in combination with an accelerometer in some cases), among other purposes. The user interface functionality 720 includes signaling and alert functionality $720_N$ (referred. to herein simply as "signaling") which may be implemented in many typical applications using vibration. In other implementations, as described further below, the encoded vibrations may be supplemented (or replaced entirely in some usage cases) by sounds and/or visual prompts.

Figure 8:
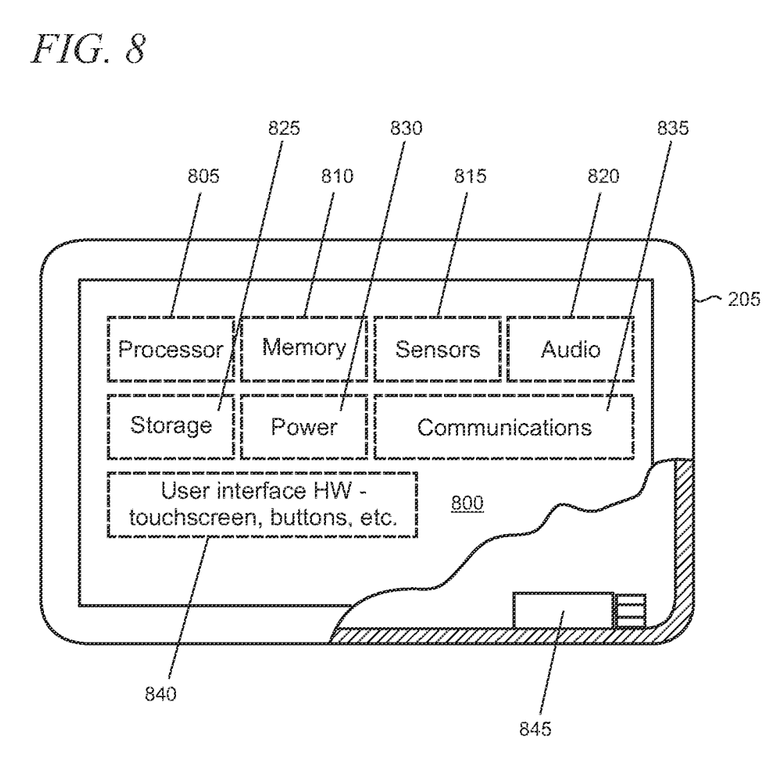
FIG. 8 shows various illustrative hardware components, including a vibration motor, that may be typically supported by a mobile device.

FIG. 8 shows various illustrative functional components 800 in a phantom view that may be typically supported by the mobile device 205 as hardware. As with the functionalities 705 shown in FIG. 7 and described above, the hardware components 800 shown and described here are intended to be illustrative. Not all mobile devices will necessarily implement all such components 800 nor are the components shown intended to constitute an exhaustive list of all hardware components that may be implemented in a given device. It is further noted that the components 800 are depicted in simplified block diagram format and therefore no structural or operational details are to be inferred from the illustration.

A processor 805 and a memory 810 are typically utilized to run the software and/or firmware that may be used to implement the various features and functions supported by the mobile device 205. While a single processor 805 is shown, in some implementations multiple processors may be utilized. Memory 810 may comprise volatile memory, non-volatile memory, or a combination of the two. Sensors 815 represent one or more hardware components that may be used to implement respective ones of the various sensor functionalities 715 depicted in FIG. 7. An audio component 820 supports sound generation such as audible alerts, voice to support telephony functionalities, and other sounds (music, audio accompanying video playback, etc.). A storage component 825 may be implemented, for example, using a hard disk drive, solid state memory/drive, or similar storage media and utilized to store machine-readable software code, user data and files, and the like. A power component 830 is typically implemented using a rechargeable battery. Communications hardware 835 represents one or more hardware components that may be used to implement respective communication functionalities 710 (FIG. 7). User interface hardware 840 represents various components that implement the user interface on the mobile device 205 such as the touchscreen display and/or physically implemented buttons and controls. The user interface hardware 840 may also include sensor functionality to receive inputs from the user 105 via physical motion imparted to the mobile device 205 such as tapping or shaking, as described in more detail below.

A vibration unit 845 may be fixedly attached to an interior portion of the mobile device 205 as shown in the top cutaway view in FIG. 8. Such attachment facilitates the coupling of the forces from operation of the vibration unit 845 (i.e., a centrifugal force and moment as described below) to the mobile device 205 so that the device vibrates responsively to the application of a drive signal to the vibration unit.

Figure 9:
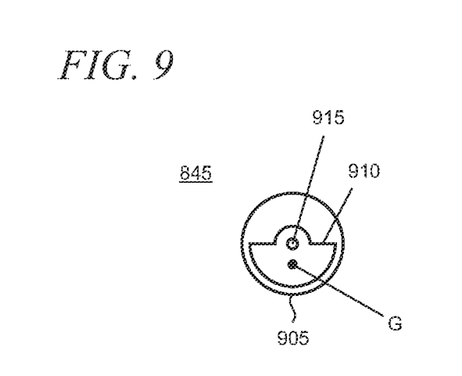
FIGS. 9 and 10 show details elan illustrative vibration motor.
Figure 10:
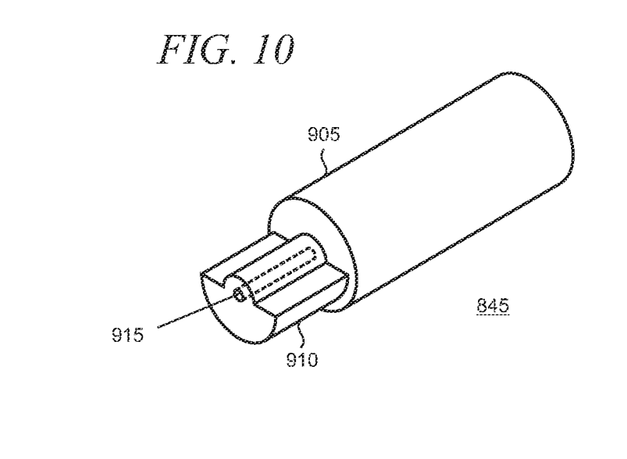

FIGS. 9 and 10 show respective front and orthogonal views of an illustrative vibration motor 905 and rotating eccentric mass 910 which comprise the vibration unit 845. The vibration unit 845 is used, in this illustrative example, to impart motion to the mobile device 205 to implement low-bandwidth navigation instructions using encoded vibrations. In alternative embodiments, other types of motion actuators such as piezoelectric vibrators, magnetic, or motor-driven linear or rotary actuators may be used.

The vibration motor 905 in this example is a DC motor having a substantially cylindrical shape which is arranged to spin a shaft 915 to which the mass 910 is fixedly attached. The vibration motor 905 may be further configured to operate to rotate the mass 910 in both forward and reverse directions. In some applications, the vibration motor 905 may also be arranged to operate at variable speeds. The eccentric mass 910 is shaped asymmetrically with respect to the shaft 915 so that the center of gravity (designated as "G" in FIG. 9) is offset from the shaft. Accordingly, a centrifugal force is imparted to the shaft 915 that varies in direction and increases in magnitude as the angular velocity of the shaft increases. In addition, a moment is applied to the vibration motor 905 that is opposite to the direction of rotation of the mass 910.

Through application of an appropriate drive signal, variations in the operation of the vibration unit 845 can be implemented, including for example, direction of rotation, duty cycle, and rotation speed. Different operating modes can be expected to affect the motion of the mobile device 205, including the direction, duration, and magnitude of the coupled vibration. Accordingly, a variety of encoded vibration signals may be implemented. In addition, while a single vibration unit is shown in FIG. 8, in some applications multiple masses and/or multiple vibration units may be fixedly mounted in different locations and orientations in the mobile device 205. In this case, finer control over the direction and magnitude of the motion that is imparted to the device 105 may typically be implemented. It will be appreciated that multiple degrees of freedom of motion with varying levels of intensity can thus be achieved by operating the vibration motors singly and in combination using different drive signals to thereby substantially increase the variety of encoded vibration signals that may be utilized in a given implementation of the present low-bandwidth navigation instruction paradigm. For example, one or more moments may be generated which would tend to cause rotation of the mobile device 205 about a given axis in a particular direction. Vibratory motion could also be imparted to the mobile device 205 in a way that favors one end of the device over the other to generate a sense of mass or weight at that end to the user.

Figure 11:
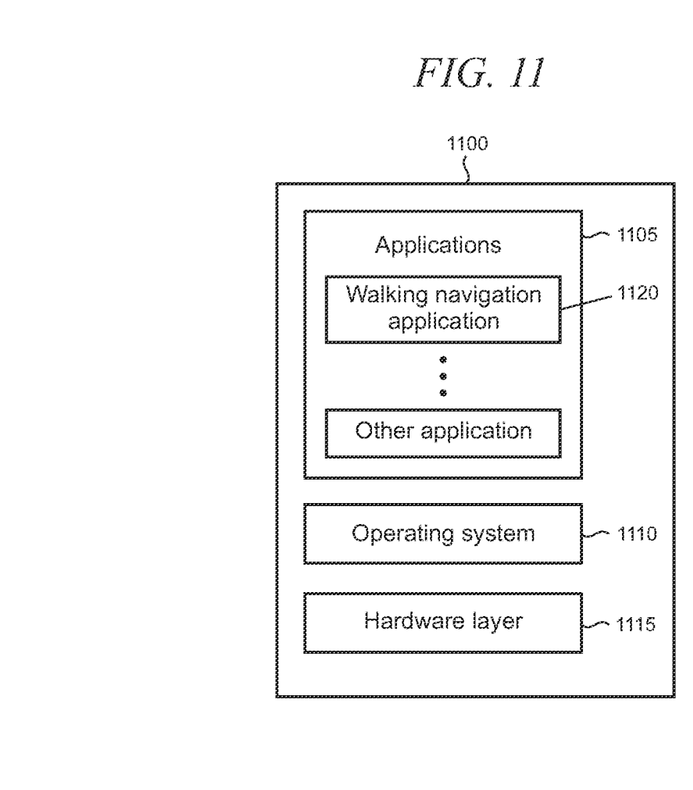
FIG. 11 shows illustrative software that may be executed on a mobile device.

FIG. 11 shows illustrative software components 1100 that may be executed on the mobile device 205 (FIG. 2). As noted above, the software components 1100 may include executable code that is stored on computer-readable media such as a hard disk drive or solid state storage device. The software components 1100 will typically include a variety of applications 1105, an operating system 1110, and a hardware layer 1115. While the particular roles of the software components can vary by device, the operating system provides the basic platform and execution environment in which the applications 1105 run. The applications 1105 may include end-user applications and applications that execute to implement device functionality such as telephony, messaging, and web browsing. Common operating systems include, for example, Windows® Mobile from Microsoft Corporation, Android OS from Android Inc., and iPhone OS from Apple Computer, Inc., among others. The hardware layer 1115 may typically comprise device drivers and the like to provide an abstraction of functionalities implemented in hardware on the mobile device 205.

Figure 12:
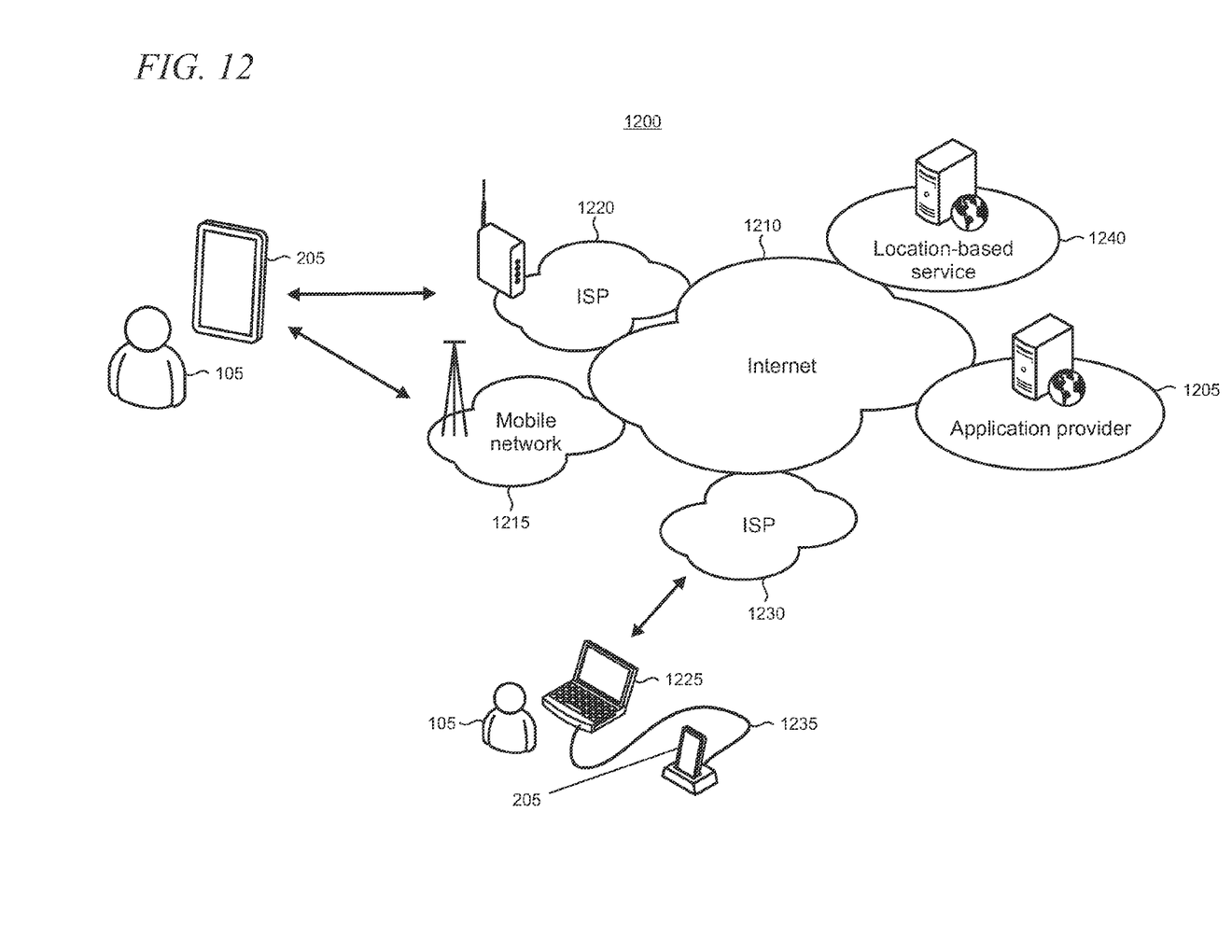
FIG. 12 shows an illustrative mobile device in communication with various cloud-based services over networking infrastructure including the Internet.

The applications 1105 can be pre-installed on the mobile device 205 or, as is becoming more common, downloaded from a cloud-based application provider as executable applications after being installed on the device. FIG. 12 shows a typical cloud computing environment 1200 which can facilitate the user 105 to download applications and updates from a cloud-based application provider 1205 to the mobile device 205, among other uses. As the terms are used here, a cloud computing environment is one in which software, development platforms, and/or infrastructure, for example, may be delivered as services to remote users and devices utilizing servers and/or data centers that are Internet-accessible (i.e., the "cloud"). A cloud computing environment can generally support many virtualization and automation solutions using a variety of resources such as computation, storage, and network that are typically elastically provided on-demand. The cloud-based application provider 1205 can leverage the capabilities provided by the cloud computing environment 1200 to enable users, for example, to browse, select, purchase (in usage scenarios where applications are purchased and sold), and then download relevant application code to the mobile device 205. In some cases an application downloaded from the provider can be implemented as a native application on the device. In other cases the application can execute in whole or in part remotely on the cloud where the client portion of the application will typically be instantiated on the device using a relatively lightweight or thin functionality such as one implemented by a mobile browser.

The user 105 can typically download applications directly to the mobile device 205 by connecting to the Internet 1210 via a mobile network 1215 that supports data communication or via a wireless connection such as WiFi to an access point to an ISP (Internet Service Provider) 1220. For example, the ISP 1220 and access point could be supported by a public WiFi hot spot at the mall 110 (FIG. 1). Alternatively, the user 105 might download an application to a personal computer 1225 via his or her home ISP 1230. The application could be transferred to the mobile device in this case using a USB connection, for example, as indicated by reference numeral 1235. As discussed in more detail below in the text accompanying FIG. 14, the cloud computing environment 1200 also supports a location-based service provider 1240.

Returning to FIG. 11, one of the applications 1105 can include a walking navigation application 1120. The walking navigation application 1120 will typically interact with the operating system 1110 and hardware layer 1115 to create a user experience that utilizes low-bandwidth signaling for navigation instructions. To provide some straightforward examples of such interactions, the operating system 1115 can provide a window on the touchscreen of the mobile device 205 in which the walking navigation application 1120 can draw its user interface. When providing navigation instructions in encoded vibrations, the application 1120 will pass parameters via the operating system to a device driver in the hardware layer 1115 to implement an appropriate signal for driving the vibration unit 845 shown in FIG. 8.

Figure 13:
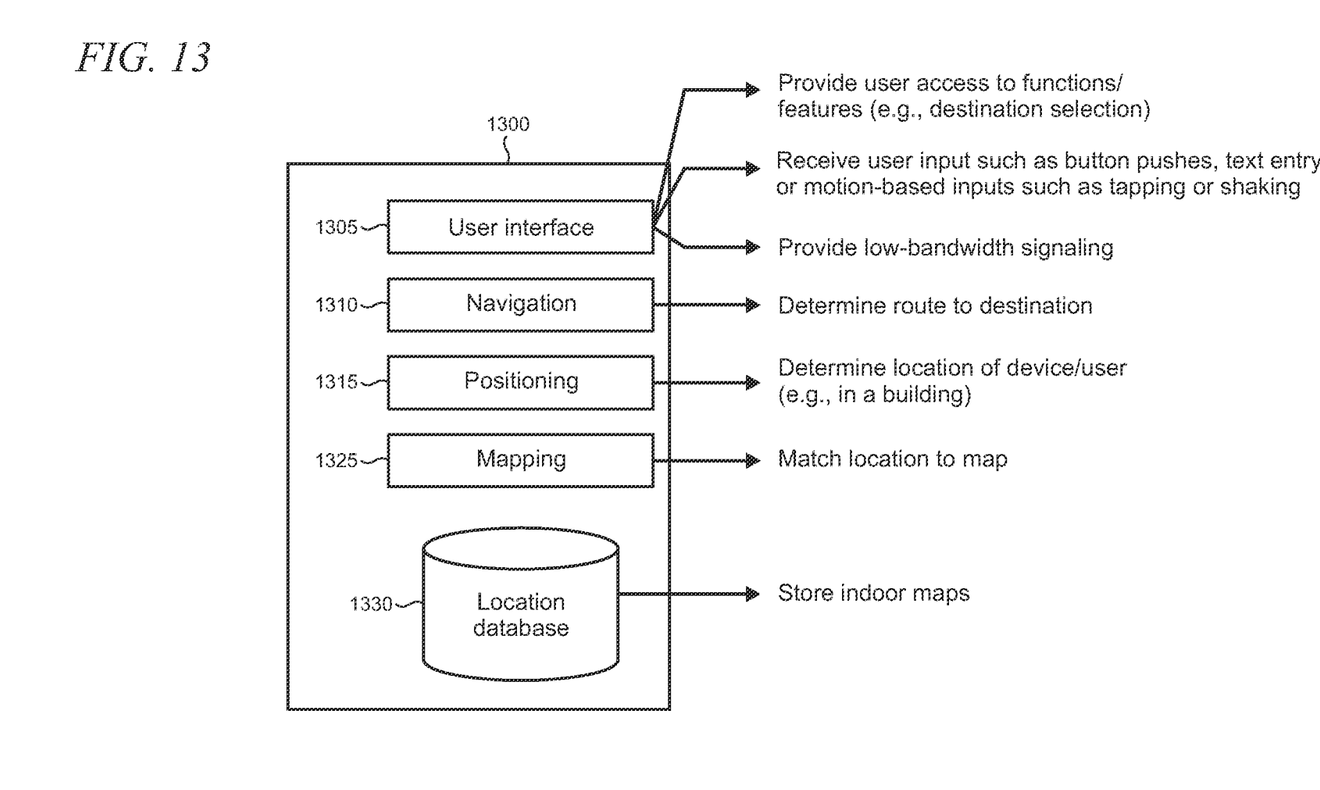
FIG. 13 shows an illustrative arrangement of five subsystems that may be embodied in whole or in part using software for implementing the present navigation instructions using low-bandwidth signaling.

More specifically, the walking navigation application 1120 can utilize several subsystems 1300, as shown in FIG. 13, that can be instantiated by the application 1120 itself or distributed across several applications and/or the operating system 1110 and other components running on the mobile device 205 (FIG. 2). The subsystems 1300 include a user interface 1305, navigation subsystem 1310, positioning subsystem 1315, mapping subsystem 1325, and location database 1330. The user interface 1305 will typically be configured to provide user access to all of the features and functions that are supported by the walking navigation application 1120. For example, the user interface 1305 can expose one or more screens to the user 105 (FIG. 1) to enable selection of a destination in the mall 110 to which the user will be guided, or provide screens, and/or implement buttons or other controls (which in may be physical controls or virtual controls displayed on the screen of the mobile device) to enable the user 105 to interact with the various features supported by the walking navigation application 1120, select preferences, effectuate settings, or the like. The user interface 1305 may also be configured to accept motion-based inputs from the user 105 via tapping or shaking the mobile device 205 in some cases. The user interface 1305 can also impart the low-bandwidth signaling to guide the user 105 to the target destination. The navigation subsystem 1310 will typically determine the optimal route to the destination and the positioning subsystem 1315 will determine the location of the mobile device 205 (and hence the user 105). The mapping subsystem 1325 will match the location from the positioning subsystem 1315 to a map that is pulled from the location database 1330. Each of the subsystems 1300 will be described in more detail below in view of the flowchart shown in FIG. 14.

Figure 14:
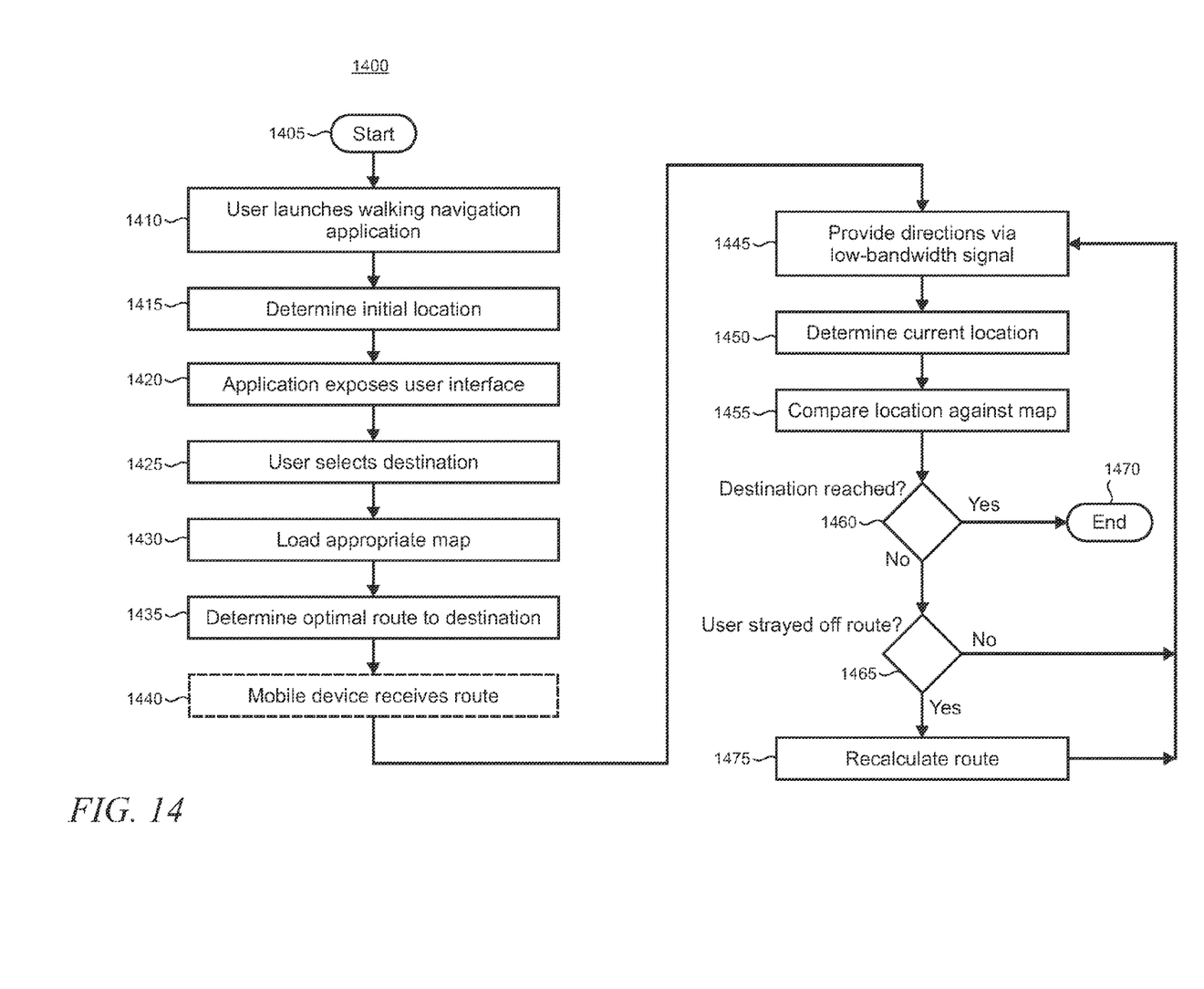
FIG. 14 shows a flowchart of an illustrative method for providing navigation instructions using low-bandwidth signaling.

FIG. 14 shows a flowchart of an illustrative method 1400 for providing navigation instructions using low-bandwidth signaling. In this particular illustrative example, the low-bandwidth signaling is implemented using encoded vibrations through the application of a drive signal to the vibration unit 845 shown in FIG. 8 and described in the accompanying text. However, other low-bandwidth signaling methodologies may also be utilized to meet the needs of a particular implementation. For example, coded audible alerts may be utilized in some cases, or the display screen on the mobile device 205 (FIG. 2) could be configured to flash a pattern. In some implementations, it may be appropriate to use various combinations or sub-combinations of vibrations, audible alerts, and visual patterns. Other low-bandwidth signaling methodologies may also be utilized including those that are not presently implemented in currently available devices. For example low-bandwidth signaling could be implemented using other sensory feedback mechanisms such as gyroscopic or other inertia-based haptic functionalities, temperature-based functionalities (i.e., heat/cold), electrical impulses, or other low-bandwidth signal types that my be directly or indirectly sensed by a human being.

The method starts at block 1405. At block 1410, the user 105 launches the walking navigation application 1120 (FIG. 11). As discussed above, the application may have been pre-installed on the mobile device 205 or the user 105 may have downloaded it to the device from an application provider such as the cloud-based provider 1205 shown in FIG. 12.

At block 1415, the positioning subsystem 1315 (FIG. 13) determines the initial location of the mobile device 205 (e.g., its initial position in the mall). The positioning subsystem 1315 may utilize any of a variety of techniques, alone or in various combinations and sub-combinations, depending on the particular requirements of a given application of the present navigation paradigm. In most indoor settings, GPS signals typically have insufficient strength to be accurately and reliably utilized as a sole source of location data. In such cases, GPS can be enhanced with other location information sources using known A-GPS (assisted GPS) techniques in which assistance from the other sources can enable GPS satellites to be located in poor signal conditions. The positioning subsystem 1315 can also utilize other conventional location techniques including Win positioning in which signal strength from known WiFi access points is measured. UWB positioning solutions have also become available. Cell-tower triangulation may also be used in some cases as a standalone location determination method or to supplement WiFi positioning capabilities and/or GPS (or A-GPS) in what is commonly termed a hybrid approach. Other short range local positioning techniques may also be employed, again either alone or to supplement other techniques, such as those using RFID, infrared, and/or Bluetooth based sensors to detect transmitters or other beacons that are positioned at known locations. In alternative implementations, sensing technologies may be extended to determine the position of the mobile device, or be combined with the other techniques described above as a supplement or enhancement. Such technologies may include radar, sonar, optical positioning sensing using cameras, and triangulation using a network of mobile devices.

Additional positioning techniques may alternatively be utilized in some implementations. Such additional techniques can supplement other techniques in various combinations or sub-combinations, or be used alone. These include estimating location using the accelerometer, compass, and/or gyroscope functionalities of the mobile device 205 by considering acceleration, velocity, and direction against a known initial position. Such techniques are commonly employed in conventional inertial navigation systems with acceptable accuracy in some usage scenarios. Dead reckoning techniques utilize similar functionalities in the mobile device 205 to calculate a position based on a known initial location in view of velocity, travel time, and direction of travel.

Continuing with the description of the illustrative method 1400, at block 1420 the walking navigation application 1120 will expose a user interface to the user 105. As noted above, the user interface typically enables the user to interact with the application and access the range of features that are supported. In this example as indicated at block 1425, the user interface provides at least a facility for the user 105 to select a desired destination, such as a store or restaurant inside the mall 110 by typing in a name using the device's keyboard or by selecting the destination from a menu, for example.

At block 1430, the walking navigation application 1120 can load one or more maps from the location database 1330 (FIG. 13) that cover the user's initial location and the destination. In some implementations, the location database 1330 can be instantiated or cached locally on the mobile device 205 and updated periodically for example, through interactions with the application provider 1205 (FIG. 12), or the location-based service 1240. In other implementations, the maps may be downloaded from the location-based service 1240 on an as-needed basis perhaps as part of a walking navigation service that is implemented, at least in part, on the cloud. The split of functionality and data used to support walking navigation between the local mobile device and cloud-based servers can vary by implementation.

At block 1435, the navigation subsystem 1310 determines a route from the user's initial location to the target destination, in typical implementations, the routing may be optimized in view of various factors, some of which may be set by the user as a preference or on a per-trip basis. For example, routing may be optimized to provide the shortest route (i.e., fewest steps), a route that favors escalators and elevators over stairs, or one that includes the types of stores or other attractions that the user has indicated are of particular interest (i.e., points of interest).

In an alternative embodiment, the steps 1415 through 1435 may be replaced by a single step (as indicated by the dashed block 1440) in which the mobile device 205 receives the route from the user's initial location to the target destination from an external source. For example, in some cases the route may be calculated by the location based service 1240 (FIG. 12) and then downloaded by the mobile device 205 over the Internet. In other cases the route may be calculated by a standalone or companion application that runs on the personal computer 1225 and then transferred to the mobile device 205 via a local USB connection or accessed by the mobile device via a remote connection to the computer. In this case, the route may be pulled from storage or a cache utilized by the walking navigation application.

At block 1445, the user interface 1305 will generate and provide the encoded vibrations to the user 105 as navigation instructions to get to the target destination. Initial navigation instructions are provided to set the user 105 off in the correct direction and encoded vibrations are periodically provided as the user progresses along the calculated route to the destination. In some cases, the user interface 1305 may provide the user 105 with an opportunity to view the entire route or parts of the route using a graphical display on the mobile device 205. The specific encoding utilized in a given implementation of the present navigation paradigm can vary. However, in typical applications the encoding utilized will be simple to facilitate ease of memorization by the user 105. Alternatively, the encoding may be selectable, in whole or in part, by the user so that it can be tailored to individual preferences or extend the signaling to impart information that goes beyond navigation. For example, the location-based service 1240 (FIG. 12) could expose an optional feature to mobile device users to choose their location to be tracked for purposes of being notified when other tracked users such as friends and family are nearby. It is emphasized that such tracking would be performed by the service 1240 solely for the purpose of enabling this notification feature at the user's option and the location information would not be stored, shared, or used for other purposes.

As noted above, some mobile devices may be configured to provide a relatively rich palette of vibration patterns that can vary in terms of length, intensity, frequency, and, other parameters to support higher-resolution navigation signaling in some cases. However, even the most basic vibration capabilities can be expected to provide satisfactory results in many applications.

Figure 15:
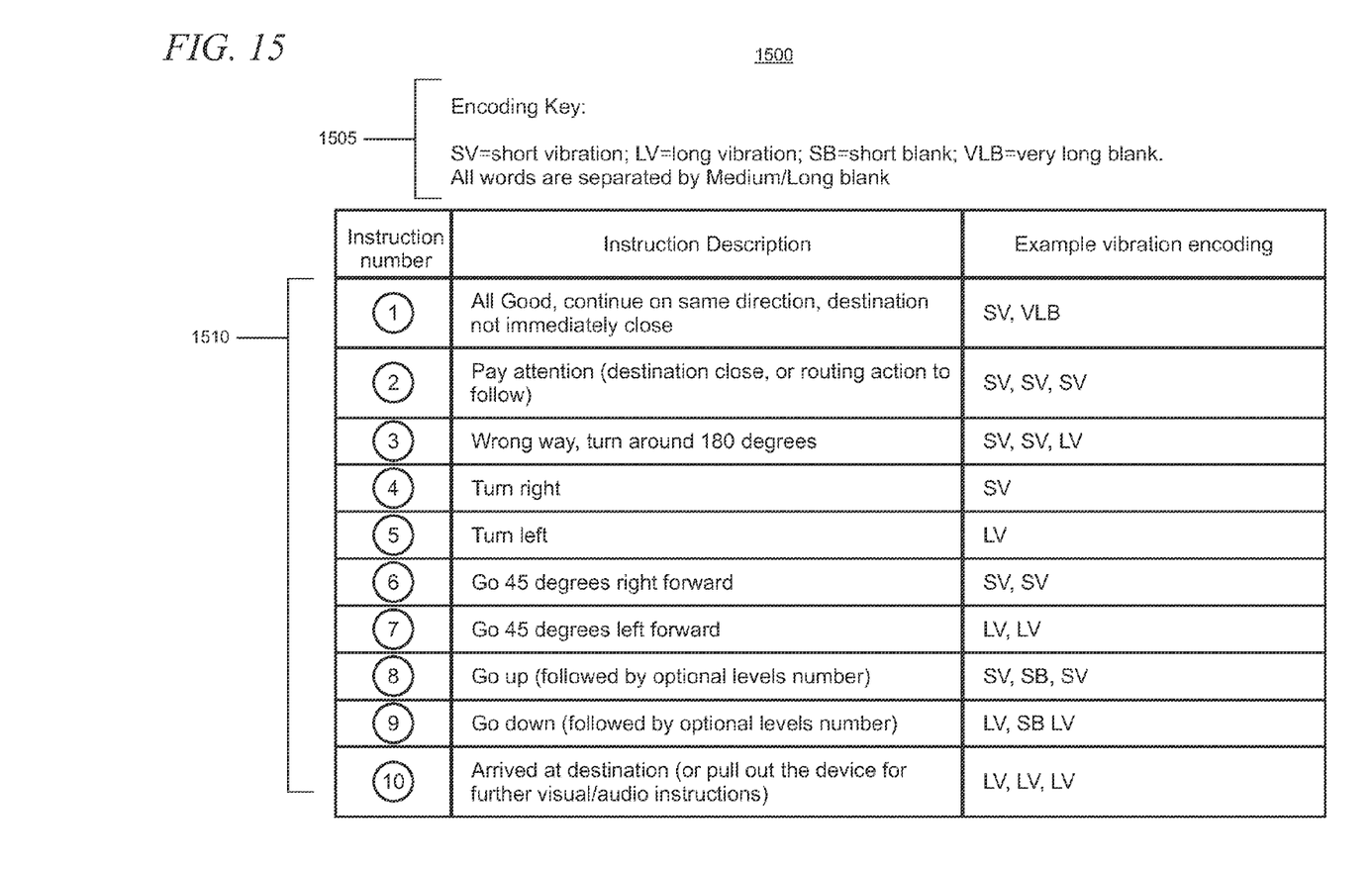
FIG. 15 shows a table that includes exemplary vibration encoding for imparting navigation instructions to a mobile device user.

FIG. 15 shows a table 1500 that includes exemplary vibration encoding for imparting navigation instructions to the user 105 of the mobile device 205. As indicated in the encoding key 1505, vibration patterns are encoded as words comprising vibrations of short and long durations. As used herein, the terms "short" and "long" are relative and the actual time intervals for any given vibration pattern can vary by implementation so long as each word can be reasonably sensed by the user 105 as being distinct. As shown, ten different navigation instructions (as indicated by reference numeral 1510) are utilized in this example, it is felt that a set of 10 instructions is a reasonable number for most users to memorize and can provide accurate and reliable navigation in a simple way without introducing ambiguity that can potentially arise with finer and more comprehensive instructions. In this way, the instruction set supports ease of use and minimal training on the part of the user while still providing powerful walking navigation features. It is emphasized that this particular navigation instruction set is illustrative and that other sets having more or fewer instructions can be utilized to strike a desired balance between simplicity and power as needed in a particular usage scenario. Alternatively, a set having a reduced number of navigation instructions may be used in some cases. For example, the instructions might utilize a simple scheme such as "getting warmer" and "getting colder" as with the popular children's game where a child is directed to a hidden or secret object with clues. As the child gets closer to the object, the other players would say "you're getting warmer" and if the child moved away from the object, the other players would say "you're getting colder". In a similar manner here, the walking navigation application may be configured to provide one particular encoded vibration to signal that the user 105 is moving closer to the target destination (i.e., is "getting warmer"), and another to indicate that the user is moving away from the target destination (i.e., is "getting colder"). For example, a faster vibration could indicate that the user is traveling in the right direction (or getting warmer) and a slower vibration could indicate that the user is traveling in the wrong direction (or getting colder).

Instruction number 1 will be periodically provided to the user 105, as appropriate, to assure the user that the walking navigation application is running and that he or she is on track and following the navigation instructions correctly. This feature enables the user 105 to traverse the route at a desired pace (brisk, leisurely, etc.), stop to window shop, or engage in other activities along the way knowing that the walking navigation application 1120 is on the job and will get the user to the desired destination without risk of getting lost. The "All Good" message from instruction number 1 will be replaced by instruction number 2 when the user needs to pay attention, for example, because a navigation instruction is pending or the destination is close by. To support the implementation of a simple user interface in this example, only a single "backwards" instruction number 3 is utilized and the remaining navigation instructions comprise basic directions such as "go left", "go right", "go up", "go down", etc., as shown in table 1500. Instruction number 10 comprising a series of three long vibration words may be utilized to indicate to the user 105 that the target destination has been reached. Alternatively, instruction number 10 may be used to indicate to the user 105 that additional information of interest is displayed on the mobile device 205. Such additional information may maintain a contextual relationship with the destinations (e.g., be a menu for the destination restaurant in the mall), or be non-contextual information such as a system alert.

Returning to FIG. 14, the method 1400 continues at block 1450. After the elapse of some interval or event (which may be defined for example, by a time period, or by the number of steps that the mobile device 205 has sensed via its accelerometer), the positioning subsystem 1315 (FIG. 13) determines the current location of the mobile device. As with the determination of the initial location, any of a variety of positioning techniques may be utilized. The determined current location is compared against the map at block 1455, and if the current position is not the target destination, and the user 105 has not substantially strayed off the route (as indicated at the respective decision blocks 1460 and 1465), then control is returned to block 1440 and additional navigation instructions are provided to the user 105 in the form of encoded vibrations. The method of blocks 1445 to 1460 is iterated until the user 105 reaches the target destination at which point the method ends at block 1470.

If the current location is determined to be off the route beyond some threshold when compared to the map (which may mean the user 105 has wandered off course, misunderstood an instruction, gotten lost, etc.), then a new route from the current location to the target destination is calculated, at block 1475, and an appropriate new navigation instruction will be provided to the user 105 in the form of encoded vibration to get the user back on course at block 1445. In some implementations, the threshold can be variable, or user-selectable via the user interface 1305 (FIG. 13) so that some leeway or margin can be utilized before corrective navigation instructions are given.

Providing navigation instructions step-wise as the user 105 progresses along a calculated route is an effective way to direct the user because nothing needs to be remembered beyond the basic codes. The user will be guided step-by-step and navigation instructions can be repeated as necessary if the navigation application determines that the user might need a reminder (for example because the user is stationary for a period beyond some interval or appears to be retracing steps). In some implementations, the user interface 1305 of the walking navigation application may be arranged to expose a control object that the user can manipulate when he or she wants to receive navigation instructions on the spot. In an illustrative example, a succession of taps (i.e., a motion-based input) imparted by the user 105 to the mobile device 205 can be used as control input to the walking navigation application. For example, two taps could be utilized to signal that the user 105 wants the last navigation instruction to be provided again. Three taps might mean the user is lost and needs another new route to the target destination to be calculated and provided by the application.

Figure 16:
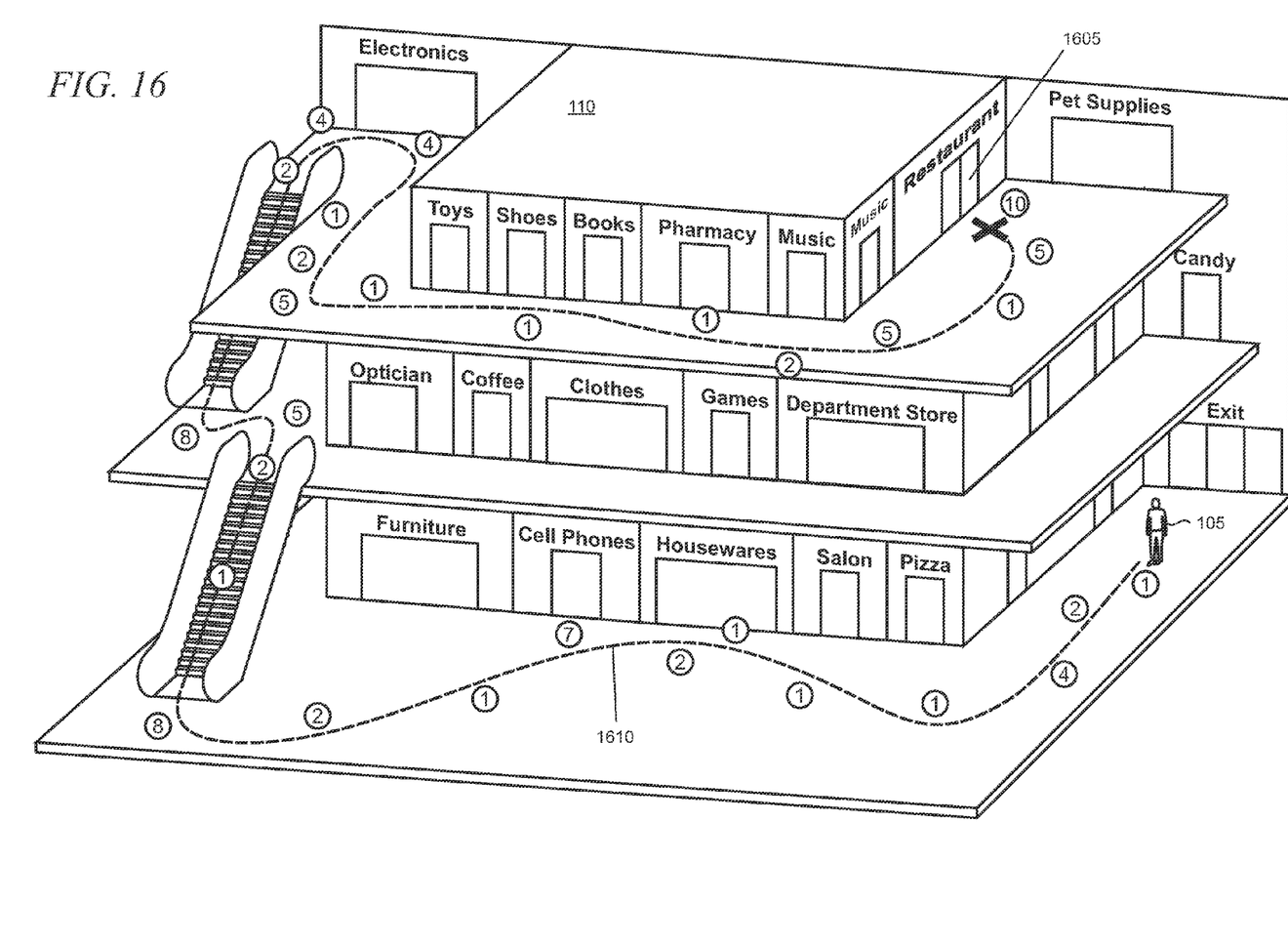
FIG. 16 shows an illustrative route inside a building for which a variety of step-wise navigation instructions are provided using encoded vibrations from a mobile device.

FIG. 16 provides a pictorial view of step-wise navigation using an example of the shopping mall 110 first shown in FIG. 1. In this illustration, an inside cutaway view of the mall is provided (where it is noted that the view is pictorial and is not drawn to scale). The destination selected by the user 105 (Who is on the ground floor of the after having come in front the parking lot) is a restaurant 1605 on the top level of the mall. The calculated route between the user's initial location and the target destination is shown by the dashed line 1610. As indicated, a sequence of encoded vibrations is provided along the route 1610 so that the user 105 is guided up two levels to the restaurant 1605. It is noted that the sequence is intended to be merely illustrative and the quantity and types of instructions can vary from that shown. In particular, the frequency in which navigation instructions are provided to the user 105 can vary by preference, or by context in some cases. For example, one user may wish to be frequently updated with navigation instructions while another may wish to be given instructions less frequently and perhaps only when a turn needs to be made or an escalator taken. In some cases, instructions can be provided more frequently to instill a sense of urgency for example, if it appears that the user 105 is straying off course.

Figure 17:
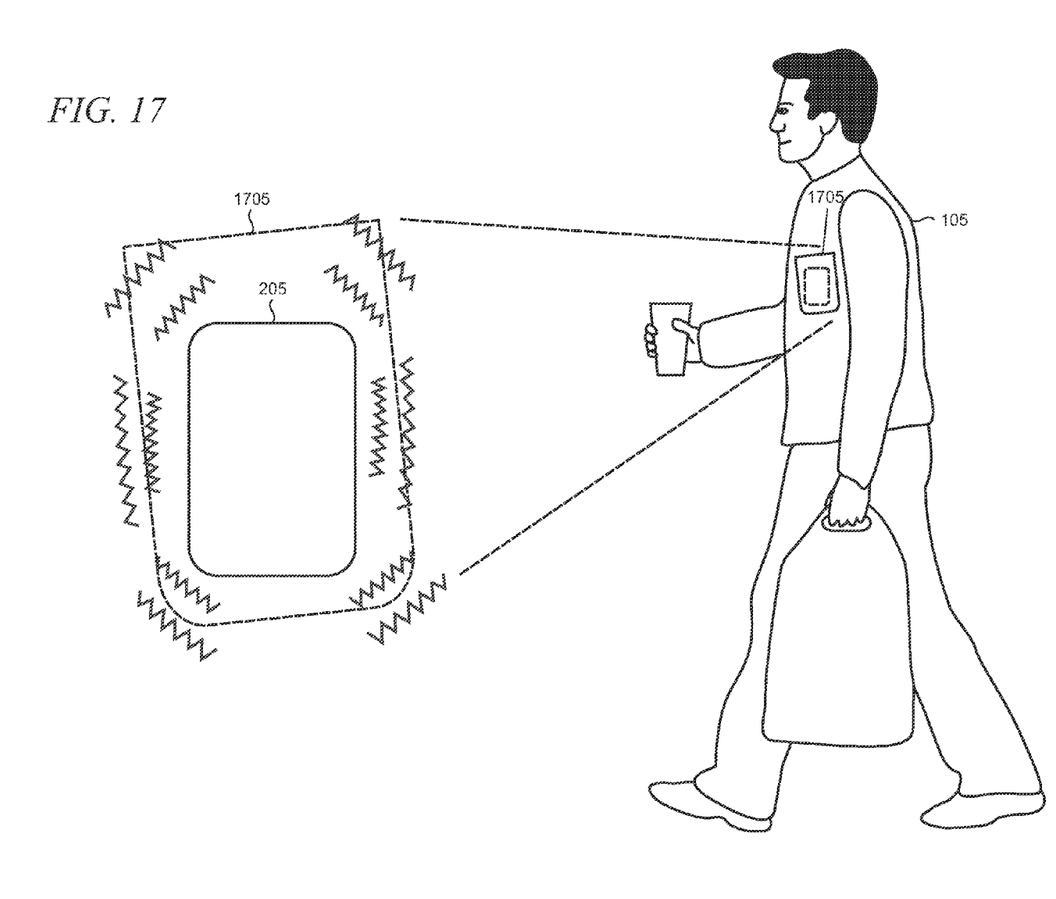
FIG. 17 shows a user receiving navigation instructions via coded vibrations from a mobile device.

FIG. 17 shows the user 105 receiving navigation instructions via coded vibrations from the mobile device 205 when stored in a shirt pocket 1705. Advantageously, the user 105 is able to receive the navigation instructions in a hands-free manner.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method implemented by an application executing on a mobile device, the method comprising the steps of:
calculating a route to the target destination from the user's location; and
using low-bandwidth signaling in the form of encoded vibrations to guide the user to the target destination using haptic feedback, the encoded vibrations being imparted to the user from the mobile device in a stepped sequence of one or more spaced, discrete vibrations that comprise a specific pattern indicating a corresponding navigation instruction, the encoded vibrations occurring in any direction.

2. The method of claim 1 further including a step of:
selecting preferences as to how the route is calculated, the preferences including criteria to be optimized including shortest route, or a route having points of interest to the user.

3. The method of claim 1 further including a step of:
determining the user's location using one of GPS, A-GPS, or hybrid positioning to locate the mobile device in an indoor space.

4. The method of claim 3 further including the steps of:
obtaining a map of the indoor space, comparing the user's position to the map; and
using the results of the comparison to generate one of the navigation instructions in the stepped sequence.

5. The method of claim 4 in which the map is read from a local database or downloaded from a remote service provider.

6. The method of claim 3 further including the steps of:
determining a threshold distance from the route, and upon the user exceeding the threshold distance from the route:
recalculating the route; and
imparting another stepped sequence of navigation instructions as the user traverses the recalculated route.

7. The method of claim 1 in which the encoded vibrations form words via patterns of short vibrations and long vibrations.

8. The method of claim 1 in which vibration encoding is arranged to facilitate memorization.

9. One or more computer-readable storage media containing instructions which, when executed on one or more processors disposed in a mobile device, implement a walking navigation application comprising:
- a positioning subsystem for determining a location of the mobile device when the mobile device is located indoors;
- a navigation subsystem for determining a route to a target destination; and
- a user interface of the mobile device for selecting the target destination and for imparting navigation instructions to the user as a stepped series of encoded vibrations that are perceptible by touch as the user traverses the calculated route, the stepped series of encoded vibrations comprising one of a plurality of specified combinations of vibrations in a pattern that indicates a specific navigation instruction.

10. The one or more computer-readable storage media of claim 9, wherein the positioning subsystem utilizes GPS at least in part to determine the location of the mobile device.

11. The one or more computer-readable storage media of claim 9, in which the positioning subsystem utilizes WiFi positioning at least in part to determine the location of the mobile device.

12. The one or more computer-readable storage media of claim 9, in which the positioning subsystem utilizes cell-tower triangulation at least in part to determine the location of the mobile device.

13. The one or more computer-readable storage media of claim 9, wherein the positioning subsystem utilizes short range positioning at least in part to determine the location of the mobile device, the short range positioning using one of RFID-, infrared-, or Bluetooth-based sensor.

14. The one or more computer-readable storage media of claim 9, further including a mapping subsystem for mapping the location of the mobile device to one or more maps that include the location of the mobile device and target destination.

15. The one or more computer-readable storage media of claim 9, wherein the user interface is configured for receiving motion-based input from the user to the mobile device, the motion-based input including one of tapping or shaking.

16. A method for providing navigation instructions to a mobile device user using low-bandwidth signaling, the method comprising the steps of:
- making available a walking navigation application to the mobile device user as a download from a cloud-based provider;
- enabling the walking navigation application to be executed upon installation on the mobile device, the walking navigation application facilitating low-bandwidth signaling to be imparted to the user to guide the user along a route, the signaling guiding the user along the route when the mobile device is in a hands free mode, the signaling resulting from tactile vibrations encoded into a respective one of the plurality of patterns, each pattern
  - including a different combination of differently spaced vibrations of different lengths, and
  - indicating a specific navigation instruction to the user; and
- providing updates to the walking navigation application from the cloud-based provider.

17. The method of claim 16, further including a step of providing maps to the walking navigation application, the maps being usable by the walking navigation application to calculate the route.

18. The method of claim 16, wherein the low-bandwidth signaling is one of tactile vibration, audio alert signal, alert signal using a range of temperatures, or visual alert signal.

19. A mobile device for providing walking instructions, comprising:
- a vibration motor;
- at least one processor executing instructions stored in a memory, the processor programmed to:
  - determine a location of the mobile device when the mobile device is located indoors;
  - determine a route to a target destination from the determined location of the mobile device; and
  - impart, via the vibration motor, navigation instructions to the user as a stepped series of encoded vibrations that are perceptible by touch as the user traverses the calculated route, at least some of the encoded vibrations being in a direction other than a direction of travel being communicated to the user.

20. The mobile device of claim 19, wherein all encoded vibrations in the stepped series are imparted in a shared direction.

21. The mobile device of claim 19, wherein the stepped series of encoded vibrations comprises a pattern of vibration durations and spacings between the vibrations.

22. The mobile device of claim 19, wherein, in the imparting, different navigation instructions are imparted via respective ones of a plurality of patterns, each pattern imparting a respective navigation instruction.

23. A processor usable memory device storing processing instructions that, when implemented by an application executing on a mobile device, cause the performance of a method comprising:
- calculating a route to a captured target destination from the user's location; and
- using low-bandwidth signaling in the form of encoded vibrations to guide the user to the target destination using haptic feedback, the encoded vibrations being imparted to the user from the mobile device as a stepped sequence of one or more spaced, discrete vibrations that comprise a specific pattern indicating a corresponding navigation instruction, the encoded vibrations occurring in any direction.

* * * * *